(No Model.)

J. R. HENRY.
AXLE.

No. 562,467. Patented June 23, 1896.

WITNESSES:
Paul Jobst
J. B. Harlinger

INVENTOR
J. R. Henry
BY
ATTORNEYS.

UNITED STATES PATENT OFFICE.

JOHN R. HENRY, OF HOMER CITY, PENNSYLVANIA.

AXLE.

SPECIFICATION forming part of Letters Patent No. 562,467, dated June 23, 1896.

Application filed June 1, 1895. Serial No. 551,376. (No model.)

*To all whom it may concern:*

Be it known that I, JOHN R. HENRY, of Homer City, in the county of Indiana and State of Pennsylvania, have invented a new and Improved Axle, of which the following is a full, clear, and exact description.

This invention relates to certain improvements in axles, and has for its object in part to provide an axle of a convenient and inexpensive construction adapted to be manufactured without requiring the axletree to be forged, which shall at the same time be at once simple and of sufficient strength, and in part to provide an axle having means for conveniently and securely attaching thereto the hub of the wheel.

The invention consists in an axle having an axletree of bar-iron, such, for example, as is common in the market, said axletree having metallic sleeves secured to its ends and adapted to receive the wheel-hubs, the said hubs and sleeves being secured together by a simple attaching device.

The invention also contains certain novel features of construction and combinations of parts, whereby certain important advantages are attained and the device is made better adapted for use than other similar devices heretofore employed, all as will be hereinafter fully set forth.

The novel features of the invention will be carefully defined in the claim.

In order that my improvements may be the better understood, I have shown in the accompanying drawings an axle constructed in accordance with my invention, in which drawings—

Figure 1:
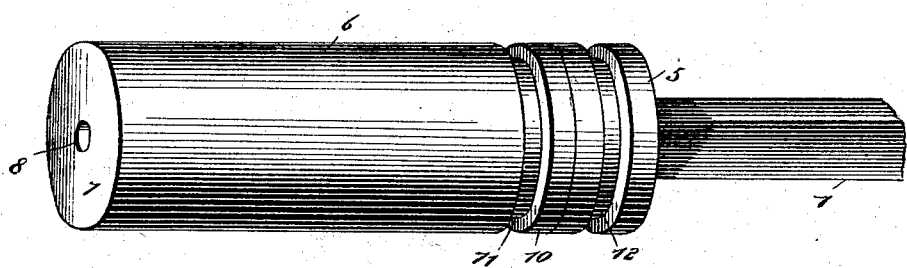
Figure 2:
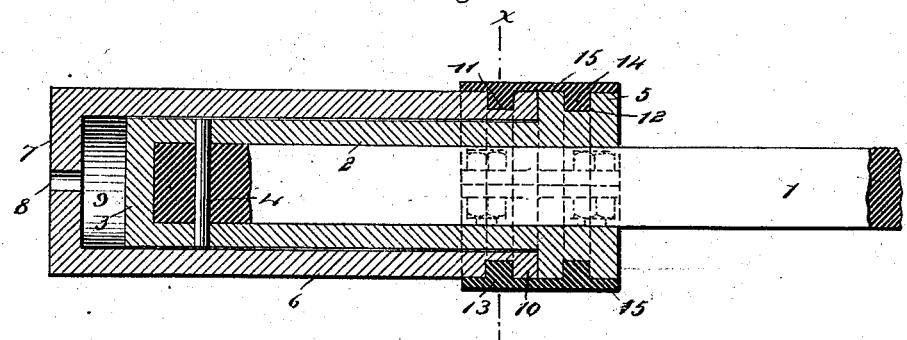
Figure 3:
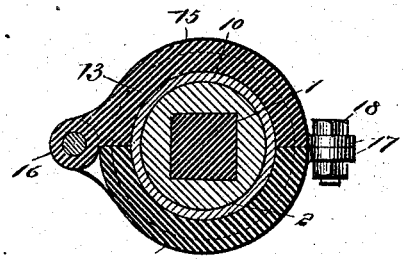
Figure 4:
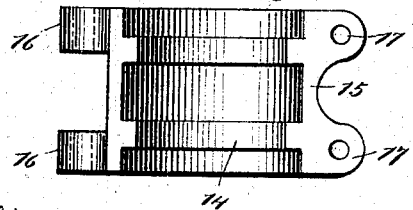

Figure 1 is a perspective view showing one end of the axle having the wheel-hub in place thereon. Fig. 2 is a longitudinal section taken through the same parts, showing the hub-attaching device in place. Fig. 3 is a transverse section taken through the axle and hub-attaching device substantially in the plane indicated by the line *x x* in Fig. 2, and Fig. 4 is a detached detail view showing one of the halves or sections of the hub-attaching device in elevation.

Like characters of reference designate corresponding parts in all the views.

In the views, 1 represents the axletree composed of bar-iron, usually square in cross-section, as clearly indicated in the drawings, and 2 represents the sleeve, having a squared recess or cavity formed longitudinally in it to receive the end of said axletree 1. The sleeve 2 is circular in cross-section and has its outer end closed, as indicated at 3 in Fig. 2, and said sleeve is secured to the end of the axletree by means of a pin 4, which extends through perforations formed in said sleeve and axletree.

The sleeve 2 is provided at its inner end with an annular head or enlargement 5, against which abuts the inner end 10 of the wheel-hub 6, rotatively mounted on the circular or rounded outer end of the sleeve 2, being provided with a cylindrical bore to receive said sleeve, and said hub is provided at its outer part with a closed end 7, and the cylindrical bore therein is of somewhat greater length than the reduced rounded part of sleeve 2, which fits therein, whereby a chamber 9 is formed between the ends of the sleeve and of the hub 6, adapted to receive a supply of oil or other lubricant, which may be replenished from time to time through an aperture 8, formed through the end wall 7 of the hub 6 at or near the center thereof.

The inner end 10 of the hub 6, which abuts against the enlargement or head 5 of the sleeve 2, is of a diameter substantially equal to that of said head or enlargement 5 and is provided with an annular peripheral groove 11, the said head or enlargement being provided with a similar groove 12, and these grooves 11 and 12 in the respective parts 10 and 5 are adapted to be engaged by annular tongues or projections 13 and 14, formed interiorly in a clamping-band 15, composed, as seen in the drawings, of two semicircular sections hinged together by a hinge 16 at one side and having at the other side projecting lugs 17, provided with perforations to receive bolts or other fastening devices 18, whereby when the sections have been secured in place with their tongues 13 and 14 engaging the grooves 11 and 12 in the hub and head, respectively, the said sections may be securely fastened against removal.

In assembling the device the axletree 1 may be cut off from a bar of iron at a suitable length and perforated to receive the pin 4, after which the sleeve 2 is applied over the end thereof and said pin inserted. The axle is then ready to receive the wheel-hub 6, which is applied over the sleeve 2, and when said hub has been placed in position the clamping-band is applied and secured in place by means of its bolts 18.

From the above description it will be seen that the device is of a very simple, durable, and inexpensive construction, there being but little labor necessary in its manufacture, and when assembled the axle is substantially as strong as an ordinary axle having an integral axletree. Moreover, the closed hub and the clamping-band for attaching the same in place provide an effective dust-guard to protect the working surfaces from dust and grit, and the construction of the hub with its central aperture 8 and its bore of greater length than the sleeve 2 provides an effective and convenient lubricator for the wheel.

Having thus described my invention, I claim as new and desire to secure by Letters Patent—

In an axle, the combination of an axletree consisting of a bar of substantially rectangular cross-section throughout its entire length, a cylindrical sleeve having a socket formed in it corresponding to the cross-section of the axletree and adapted to receive the same, a pin passed through the sleeve and axletree to hold the parts together, said sleeve being provided with a reduced outer portion, and an enlarged rounded head at its inner end, said head forming at its outer edge a shoulder and having an annular groove in its periphery, a cylindrical wheel-hub having a bore to receive the reduced portion of the sleeve and having an external diameter corresponding to that of the rounded head of the sleeve, said hub having its inner end provided with a peripheral annular groove and arranged to abut against the shoulder formed by the outer edge of said head of the sleeve, and a clamping-band comprising two semicircular sections hinged together and arranged to embrace the adjacent grooved portions of the hub and head of the sleeve, said clamping-band being provided with interiorly-projecting tongues engaging the grooves in the head and hub, and having means for locking its sections together when said tongues are engaged in said grooves, substantially as set forth.

JOHN R. HENRY.

Witnesses:
ROBERT C. DRENNING,
SAMUEL STITT.